US012093822B2

(12) United States Patent
Schneuwly et al.

(10) Patent No.: US 12,093,822 B2
(45) Date of Patent: Sep. 17, 2024

(54) ANOMALY DETECTION BASED PREPROCESSING FOR BETTER CLASSIFICATION TASKS WITH NOISY AND IMBALANCED DATASETS

(71) Applicant: Oracle International Corporation, Redwood Shores, CA (US)

(72) Inventors: Arno Schneuwly, Effretikon (CH); Suwen Yang, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 35 days.

(21) Appl. No.: 17/976,473

(22) Filed: Oct. 28, 2022

(65) Prior Publication Data

US 2024/0143993 A1 May 2, 2024

(51) Int. Cl.
*G06F 11/00* (2006.01)
*G06F 11/07* (2006.01)
(Continued)

(52) U.S. Cl.
CPC ........... *G06N 3/08* (2013.01); *G06F 11/0727* (2013.01); *G06F 11/079* (2013.01); *G06N 3/04* (2013.01)

(58) Field of Classification Search
CPC ....... G06F 11/079; G06F 11/027; G06N 3/04; G06N 3/08
(Continued)

(56) References Cited

U.S. PATENT DOCUMENTS 10,216,558 B1 2/2019 Gaber et al.
10,509,847 B1* 12/2019 Xu .......................... G06F 17/18
(Continued)

FOREIGN PATENT DOCUMENTS

CN 107 769 972 A 3/2018

OTHER PUBLICATIONS

Zhao et al., "Multivariate Time-series Anomaly Detection via Graph Attention Network", IEEE International Conference on Data Mining, DOI: 10.1109/ICDM50108.2020.00093, dated Nov. 2020, 10 pages.

Murray et al., "Machine Learning Methods for Predicting Failures in Hard Drives: A Multiple-Instance Application", Journal of Machine Learning Research 6, dated 2005, 34 pages.

Botezatu et al., "Predicting Disk Replacement Towards Reliable Data Centers", . In Proceedings of the 22nd ACM SIGKDD International Conference on Knowledge Discovery and Data Mining, https://doi.org/10.1145/2939672.2939699, dated Aug. 2016, 10 pages.

(Continued)

*Primary Examiner* — Sarai E Butler
(74) *Attorney, Agent, or Firm* — Hickman Becker Bingham Ledesma LLP; Brian Miller

(57) ABSTRACT

A computer trains, based on many timeseries, many anomaly detectors. Each anomaly detector is configured with a respective distinct contamination factor. Each timeseries is a temporal sequence of datapoints that characterize a device. Each datapoint in the many timeseries has a respective label that indicates whether the device failed when the datapoint occurred. Each anomaly detector detects: a set of anomalous datapoints, the size of which is proportional to the contamination factor of the anomaly detector, a healthy count of anomalous datapoints in timeseries of devices not failed, and an unhealthy count of anomalous datapoints in timeseries of failed devices. For a particular anomaly detector, the computer detects that the magnitude of the difference between the respective healthy count and the respective unhealthy count is less than a predefined threshold. Based on the contamination factor of the particular anomaly detector, anomalous datapoints are oversampled. Based on the oversampled anomalous datapoints, a classifier is trained.

20 Claims, 5 Drawing Sheets

(51) Int. Cl.
G06N 3/04 (2023.01)
G06N 3/08 (2023.01)

(58) Field of Classification Search
USPC .................................................. 714/1–57
See application file for complete search history.

(56) References Cited

U.S. PATENT DOCUMENTS

| | | | |
|---|---|---|---|
| 10,726,930 | B2 | 7/2020 | Sarkar et al. |
| 11,429,845 | B1* | 8/2022 | Angelov ................. G06N 3/10 |
| 2008/0189575 | A1* | 8/2008 | Miguelanez ....... G05B 23/0229 714/25 |
| 2008/0270824 | A1* | 10/2008 | Kroesche ............... G11C 29/44 714/6.11 |
| 2012/0290879 | A1* | 11/2012 | Shibuya ............... G05B 23/021 714/26 |
| 2015/0006972 | A1* | 1/2015 | Jones .................... G06F 11/076 714/47.2 |
| 2019/0228296 | A1* | 7/2019 | Gefen ...................... G06N 7/01 |
| 2020/0117534 | A1* | 4/2020 | Yurzola ................ G06F 3/0619 |
| 2020/0134441 | A1* | 4/2020 | Suthar ..................... G06F 9/50 |
| 2020/0252506 | A1* | 8/2020 | Akanksha ......... H04M 3/42102 |
| 2020/0342265 | A1 | 10/2020 | Cai |
| 2020/0380336 | A1* | 12/2020 | Chowdhury ........... G06N 3/044 |
| 2021/0117268 | A1* | 4/2021 | Koeberl .............. G06F 11/0709 |
| 2021/0216848 | A1* | 7/2021 | Poghosyan ......... G06F 11/3006 |
| 2021/0287136 | A1 | 9/2021 | Das |
| 2022/0222931 | A1 | 7/2022 | Goyal |
| 2023/0147668 | A1* | 5/2023 | Penugonda ......... G06F 11/0772 714/38.1 |

OTHER PUBLICATIONS

Chawla et al., "SMOTE: Synthetic Minority Over-sampling Technique", Journal of Artificial Intelligence Research, vol. 16, DOI: https://doi.org/10.1613/jair.953, dated Jun. 2002, 37 pages.
Domingos, Pedro, "MetaCost: A General Method for Making Classifiers Cost-Sensitive", In Proceedings of the 5th ACM International Conference on Knowledge Discovery and Data Mining, dated Aug. 1999, 10 pages.
Han et al., "Robust Data Preprocessing for Machine-Learning-Based Disk Failure Prediction in Cloud Production Environments", https://arxiv.org/abs/1912.09722, dated Dec. 2019, 12 pages.
Klein, Andrew "Behind the Curtain of Backblaze Hard Drive Stats", http://storageconference.us/2017/Presentations/Klein.pdf, dated May 2017, 36 pages.

Lu et al., "Making Disk Failure Predictions SMARTer!", in Proceedings of the 18th USENIX Conference on File and Storage Technologies, https://www.usenix.org/conference/fast20/presentation/lu, dated Feb. 2020, 19 pages.
Mahdisoltani et al., "Proactive Error Prediction to Improve Storage System Reliability", in Proceedings of the 2017 USENIX Annual Technical Conference, ISBN 978-1-931971-38-6, dated Jul. 2017, 13 pages.
Afolabi et al., "Hierarchical Meta-Learning in Time Series Forecasting for Improved Interference-Less Machine Learning", Symmetry, vol. 9, Iss. 11, dated Nov. 2017, 20 pages.
Montrenko et al., "Feature Generation for Multiscale Time Series Forecasting", http://www.machinelearning.ru/wiki/images/b/b8/Multiscale2016ICDM.pdf, dated 2016, 8 pages.
Zhu et al., "Proactive Drive Failure Prediction for Large Scale Storage Systems", In 2013 IEEE 29th Symposium on Mass Storage Systems and Technologies, DOI: 10.1109/MSST.2013.6558427, dated May 2013, 5 pages.
Pinheiro et al., "Failure Trends in a Large Disk Drive Population", 5th USENIX Conference on File and Storage Technologies, dated 2007, 13 pages.
Schmidt, Michael "Automated Feature Engineering for Time Series Data", Kdnuggets, https://www.kdnuggets.com/2017/11/automated-feature-engineering-time-series-data.html, dated 2017, 5 pages.
Schroeder et al., "Understanding Disk Failure Rates: What does an MTTF of 1,000,000 Hours Mean to You?", ACM Transaction on Storage, vol. 3, Iss. 3, dated Oct. 2007, 16 pages.
Shipmon et al., "Time Series Anomaly Detection: Detection of Anomalous Drops with Limited Features and Sparse Examples in Noisy Highly Periodic Data", https://doi.org/10.48550/arXiv.1708.03665, dated Aug. 2017, 9 pages.
Xiao et al., "Disk Failure Prediction in Data Centers Via Online Learning", In Proceedings of the 47th International Conference on Parallel Processing, DOI: https://doi.org/10.1145/3225058.3225106, dated Aug. 2018, 10 pages.
Xu et al., "Improving Service Availability of Cloud Systems by Predicting Disk Error", in Proceedings of the 2018 USENIX Annual Technical Conference, https://www.usenix.org/conference/atc18/presentation/xu-yong, dated Jul. 2018, 14 pages.
Zhang et al., "Deep Symbolic Representation Learning for Heterogeneous Time-Series Classification", https://doi.org/10.48550/arXiv.1612.01254, dated Dec. 2016, 10 pages.
Malhotra et al., "Long Short Term Memory Networks for Anomaly Detection in Time Series", in Proceedings of the 23rd European Symposium on Artificial Neural Networks, Computational Intelligence and Machine Learning, dated Apr. 2015, 6 pages.

* cited by examiner

ANOMALY DETECTION BASED PREPROCESSING FOR BETTER CLASSIFICATION TASKS WITH NOISY AND IMBALANCED DATASETS

FIELD OF THE INVENTION

The present invention relates to training corpus engineering for a classifier. Herein training oversampling is based on measurements of an original corpus by differently trained anomaly detectors.

BACKGROUND

Reducing data loss rate is crucial in data centers to improve cloud storage reliability, availability, and serviceability (RAS). Hard drives are widely used in data centers and its large population makes proactive drive failure prediction important to reduce the data loss rate and improve the reliability. Usually hard drive failure prediction is modelled as a classification problem where a model is trained to predict whether a drive is healthy or not. The true positive rate (TPR) and false positive rate (FPR) are two figures-of-merit to evaluate the performance of a model. The higher the TPR, the lower the data loss rate is. The lower the FPR, the lower the maintenance cost due to falsely removed drives. However, the following are some challenges hindering the improvement of the TPR and the FPR.

There may be labelling errors. Before data forensics and scrubbing, the dataset (i.e. training corpus) is noisy. For example, a drive may be mislabeled as failed while the system may have instead actually failed for some other reasons unrelated to the hard drive itself. Using these mislabeled failed drives to train a failure prediction model increases the FPR. The state of the art does not automate label correction.

Healthy drive samples may also be noisy. If samples are collected for operating drives on a given day, these samples are labelled as healthy. However, a drive may fail the next day. This drive may have become faulty much earlier and might appear somewhat unhealthy on days before the failure. Using this sample as healthy sample in the training dataset will decrease the TPR.

Operational status transitions may be blurry. When to label the operational status of a failed drive as failed is crucial. Hard drives are fail-slow hardware which can still function but in a degraded mode. In other words, a failed drive may start to have failure symptoms several days or months before the day the drive fails and is taken out of service. In the state of the art, the last operating date is used as the failure date and only the sample on each failure date (i.e. one sample per failed drive) is used for training, which may miss important changes in the health trajectory to the drive failure. On the failure date, a drive may not have relevant changes to differentiate itself from the healthy drives. This has a negative impact on the TPR. Another disadvantage is that using the data only on the failure date may not be helpful to forecast the failure of a drive in advance.

Statistical analysis needs a large pool of failed drives of all failure types. Due to the low annual failure rate (AFR) of hard drives, it may take several years to collect enough failed drives to perform statistical analysis.

Some healthy samples come from failed drives. Getting representative healthy samples such that a classification model can generalize well from the samples to improve FPR without degrading TPR is an ongoing technical challenge.

Healthy sample generation is usually ignored in many academic papers because the datasets already have too many healthy samples and most efforts are instead made to down sample healthy drives or oversample failed drives. Even though a dataset has far more samples for healthy drives, the feature space for healthy drives is huge and it is hard to say that the sampled healthy space is a good representative of the whole healthy feature space. For example, only taking samples for healthy drives in a data center in the same week, the samples may look similar to each other because the drives' working environment is similar in that week. Hence, the overlap between the feature space for the healthy samples and the whole healthy feature space may be low.

Anomalous samples rarely come from healthy drives. Surprisingly some healthy samples are detected as anomalous. These rare healthy samples are not learned well during the training because they do not contribute significantly to the loss function during training. State of the art classification models cannot learn well from these rare healthy samples which causes an increase of the FPR.

The training dataset for hard drives is extremely imbalanced. The AFR of a drive is around 0.5%. In an example fleet of ten thousand drives, there may be several failed drives per month. A naive classification model will learn to predict the healthy drives well with a low FPR and low TPR.

SMOTE discussed herein is an oversampling technique to generate synthetic samples by interpolating from the minority samples close to each other in the feature space. However, oversampling the minority class may amplify the noise in the dataset which will degrade the FPR and increase costs discussed herein.

Using clustering to down sample the majority class is an option to balance the dataset. This technique will significantly increase the FPR because many healthy samples closer to the failed samples in the feature space are predicted as failed.

Sampling based on class weights encourages a model to learn more about a particular class. The weight is usually proportional to the ratio between majority class and minority class. With mislabeled samples in the minority class, this technique will amplify the noise, increase the FPR and hence the operational cost.

DETAILED DESCRIPTION

Figure 1:
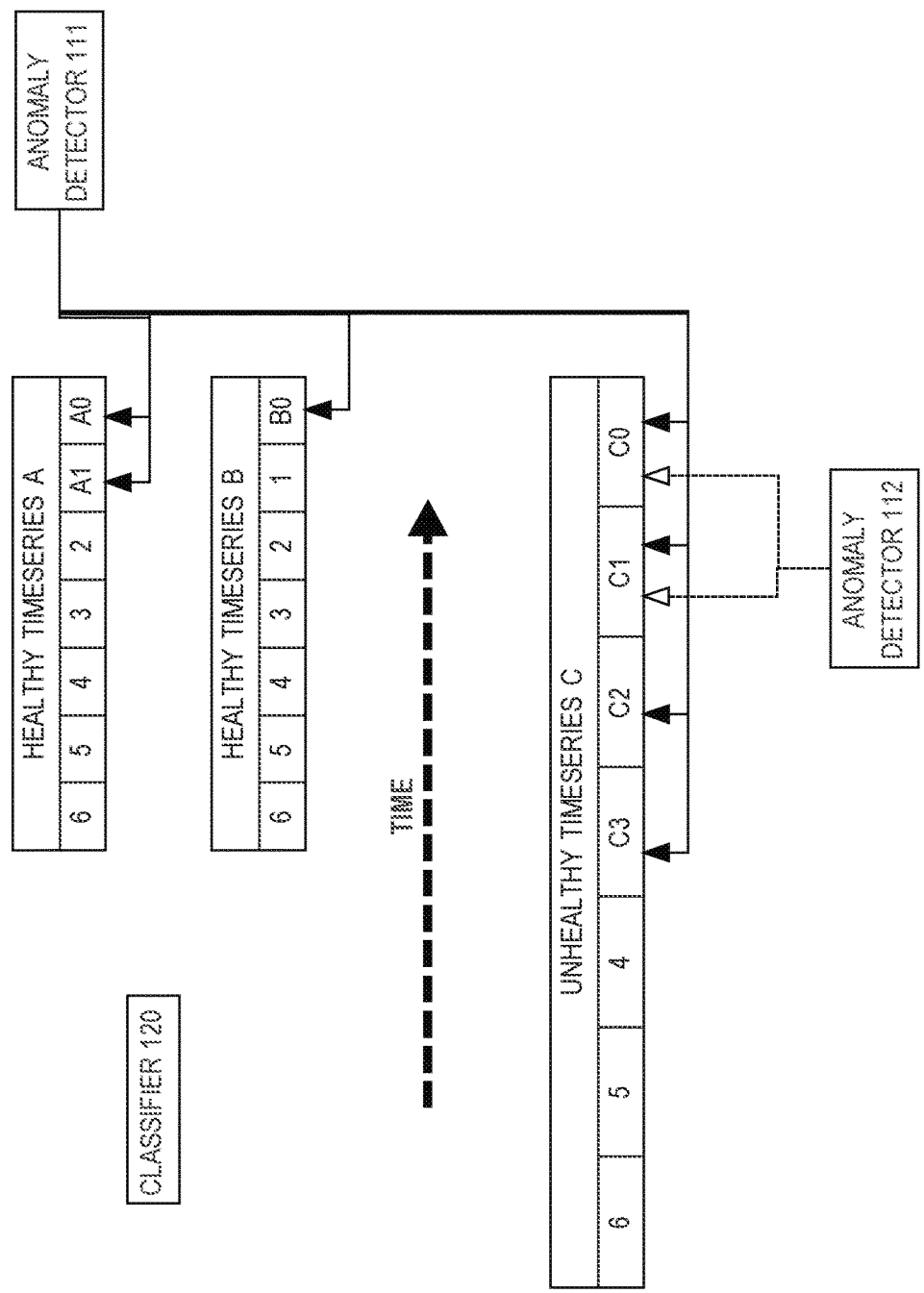
FIG. 1 is a block diagram that depicts an example computer that engineers a training corpus for a classifier, including oversampling based on measurements of datapoints in timeseries by distinct anomaly detectors.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is an anomaly detection based approach to preprocess noisy and highly imbalanced timeseries datasets for more accurate classification. Anomaly detection models filter out noise in the original dataset. Multiple anomaly detection models contribute to assigning sampling bias to samples. This approach oversamples anomalous samples with replacement according to their assigned sampling bias. With a cleaner dataset, oversampling based on labels corrected herein does not amplify the noise in the dataset. Additional techniques diversify the feature space to improve the performance of a classification model.

In an embodiment, a real-world dataset is based on hard-drive log data for drive failure prediction, which achieves a more balanced and cleaner dataset and increases the true positive rate (TPR) without significantly compromising the false positive rate (FPR).

This is an anomaly detection based technique to preprocess the timeseries in the dataset, which improves the TPR and the FPR by:
Using anomaly detection to filter out mislabeled failed drives,
Using anomaly detection to find anomalous samples in the pool of healthy and failed drives,
Oversampling samples from failed drives with replacement based on multiple anomaly detectors,
Oversampling samples from healthy drives with replacement based on multiple anomaly detectors, and
Diversifying the dataset with healthy samples from failed drives.

Labels are reassigned or initially assigned as follows. Anomalous samples from failed drives become labeled as failed. Only the last datapoint in an unhealthy timeseries becomes labeled as failed.

This technique differs from the techniques in the literature in the following ways. Without domain expertise, this technique filters out noise. With N anomaly detection models, if all the samples from a failed drive are not predicted as anomalous by most of the models, with high probability this drive is mislabeled and its samples should be removed from the training dataset.

Herein is a new way to score a sample based on results of the N anomaly detection models. If a sample is detected as an anomaly by m models out of N models, the score of this sample is m. Hence, the score is the number of times a sample is predicted as an anomaly by these N different models.

Instead of down sampling, an oversampling technique balances the dataset. Oversampling is avoided in the state of the art because it amplifies noise in the dataset. Because the approach herein filters out noise, oversampling helps to improve the FPR and the TPR.

The oversampling technique is different from the conventional technique in two ways. It oversamples both healthy and failed samples. This oversampling is based on a count of how many anomaly detectors recognize each sample as anomalous. If a sample has a nonzero count, it gets oversampled more. With this kind of oversampling, amplifying noise is avoided.

This approach diversifies the healthy space by collecting healthy samples from trajectories of failed drives. The following advantages are provided.
Applicable to small data centers where collecting enough failed hard drives for training takes years.
Without expertise knowledge, can filter out noise in the dataset.
With the better TPR and FPR, can improve the service availability.

In an embodiment, a computer trains, based on many timeseries, many anomaly detectors. Each anomaly detector is configured with a respective distinct contamination factor. Each timeseries is a temporal sequence of datapoints that characterize a device. Each datapoint in the many timeseries has a respective label that indicates whether the device failed when the datapoint occurred. Each anomaly detector detects after said training:
a respective set of anomalous datapoints, the size of which is proportional to the contamination factor of the anomaly detector,
a respective healthy count of anomalous datapoints in timeseries not containing a datapoint whose label indicates the device failed, and
a respective unhealthy count of anomalous datapoints in timeseries containing a datapoint whose label indicates the device failed.

For a particular anomaly detector, the computer detects that the magnitude of the difference between the respective healthy count and the respective unhealthy count is less than a predefined threshold. Based on the contamination factor of the particular anomaly detector, anomalous datapoints are oversampled. Based on the oversampled anomalous datapoints, a classifier is trained.

1.0 EXAMPLE COMPUTER

FIG. 1 is a block diagram that depicts an example computer 100, in an embodiment. Computer 100 engineers the training corpus for classifier 120, including oversampling based on measurements of datapoints in timeseries A-C of an original corpus by distinct anomaly detectors 111-112. Computer 100 may be one or more of a rack server such as a blade, a personal computer, a mainframe, or a virtual computer.

Each of timeseries A-C represents a temporal sequence of periodic measurements such as operational statistics or telemetry of a respective computer peripheral such as a disk drive or internet of things (IoT) device. Each of timeseries A-C has shown offsets 0-6 that each correspond to respective point in time in the temporal sequence of the timeseries. In an embodiment, adjacent offsets are separated by a fixed period. For example, each offset may correspond to a respective day in a sequence of days.

1.1 Datapoints in Timeseries

Each offset in a timeseries stores a datapoint that records a unidimensional or multidimensional observation, depending on the embodiment. A multidimensional datapoint has a respective scalar value for each observed variable. A unidimensional datapoint has only one variable. All datapoints in all timeseries A-C have a same dimensionality.

In an embodiment, each observed variable is a distinct Self-Monitoring, Analysis, and Reporting Technology (SMART) attribute of disk drive health. Specific SMART attributes and techniques are presented in "Making Disk Failure Predictions SMARTer!" published by Sidi Lu et al in 18th USENIX Conference on File and Storage Technologies (FAST 20) in year 2020, which is incorporated in its entirety herein.

The respective device (not shown) of each of healthy timeseries A-B did not fail during the respective timeseries. The respective device of unhealthy timeseries C failed during timeseries C. Here, an unhealthy timeseries means that the device (e.g. disk drive) associated with the timeseries failed at the end of the timeseries, which is always offset 0 in any timeseries. As shown by the bold dashed horizontal time arrow pointing rightwards, time already flowed through any timeseries from left to right such that offset 6 is the oldest and originally recorded first, and offset 0 is the latest and originally recorded last.

1.2 Distinct Anomaly Detectors

By definition, the device of any unhealthy timeseries failed during offset 0 and had not yet failed in offsets 1-6. Even though a disk might not crash until offset 0, the disk drive may appear (e.g. monotonically increasingly) unhealthy and in service at offset 1 and possibly likewise at some adjacent earlier offsets 2-6. For example, anomaly detector 112 detects (i.e. shown white arrowheads) datapoints C0-C1 (i.e. values stored in offsets 0-1 in unhealthy timeseries C) are anomalous, and anomaly detector 111 agrees (i.e. shown black arrowheads) that datapoints C0-C1 are anomalous.

The absence of vertical arrowheads reaching the bottom of offsets 4-6 in unhealthy timeseries C indicates that offsets 4-6 store datapoints that all anomaly detectors 111-112 agree are normal (i.e. not anomalous). In other words, timeseries C initially appeared healthy during offsets 4-6 but began appearing unhealthy when datapoint C3 occurred at offset 3. Anomaly detectors 111-112 do not agree that timeseries C is unhealthy until datapoint C1 occurs at offset 1.

Timeseries C is labeled unhealthy because its disk failed (e.g. crashed or fell below a health threshold and was taken out of service) at offset 0. Timeseries C is labeled unhealthy, but not because it contains datapoints C0-C3 that anomaly detectors 111 and/or 112 detect as anomalous. For example, a timeseries (not shown) may be labeled unhealthy even though the timeseries contains no anomalous datapoint.

For example, the datapoint in offset 0 may be non-anomalous even though a timeseries is unhealthy because the disk crashes during non-anomalous offset 0. Labeling of timeseries A-C as healthy or unhealthy may occur before anomaly detectors 111-112 are used.

In an embodiment, different timeseries may have different lengths (i.e. counts of offsets). In an embodiment, healthy timeseries are longer than unhealthy timeseries.

Offsets in a timeseries are relative to the temporal start of the timeseries. Different timeseries may have same or different start times. In an embodiment, all healthy timeseries end at a same time in the past (e.g. a month ago). In an embodiment, healthy timeseries A is ignored (i.e. not used to train classifier 120 as discussed later herein) if healthy timeseries A ends in the past but the corresponding disk as already since failed.

There is a granularity mismatch between: a) device status as failed or not failed, without regard for individual datapoints in the timeseries and b) a single datapoint accepted as sole input for inferencing by any of machine learning models 111-112 and 120. For example as shown, anomaly detector 111 detects that datapoint B0 is anomalous in timeseries B, but timeseries B is labeled as healthy. Models 111-112 and 120 accept only a point-in-time (i.e. datapoint) instead of all or a subsequence of a timeseries.

During inferencing for a datapoint, models 111-112 and 120 should ignore the timeseries of the datapoint and ignore the label of the timeseries. Models 111-112 and 120 are stateless because they do not retain temporary data between inferences. In other words, models 111-112 and 120 accept an input datapoint through a peephole such that the datapoint should be processed by itself 1.3 Classifier In an embodiment, anomaly detectors 111-112 infer a numeric anomaly score that is anomalous when an anomaly threshold is exceeded. In an embodiment, anomaly detectors 111-112 are binary classifiers that do not infer an anomaly score. Depending on the embodiment, classifier 120 does or does not recognize (i.e. infer) more than two classes. For example, classes may be naturally ordered by severity.

Anomaly detectors 111-112 are trained before classifier 120 is trained. Anomaly detectors 111-112 are used to decide which of timeseries A-C, and which portions, should be oversampled to train classifier 120. Oversampling the training corpus (i.e. timeseries A-C) of anomaly detectors 111-112 is used to effectively synthesize an improved training corpus for classifier 120. Oversampling mechanisms are presented later herein.

2.0 EXAMPLE DATASET PREPROCESSING

Figure 2:
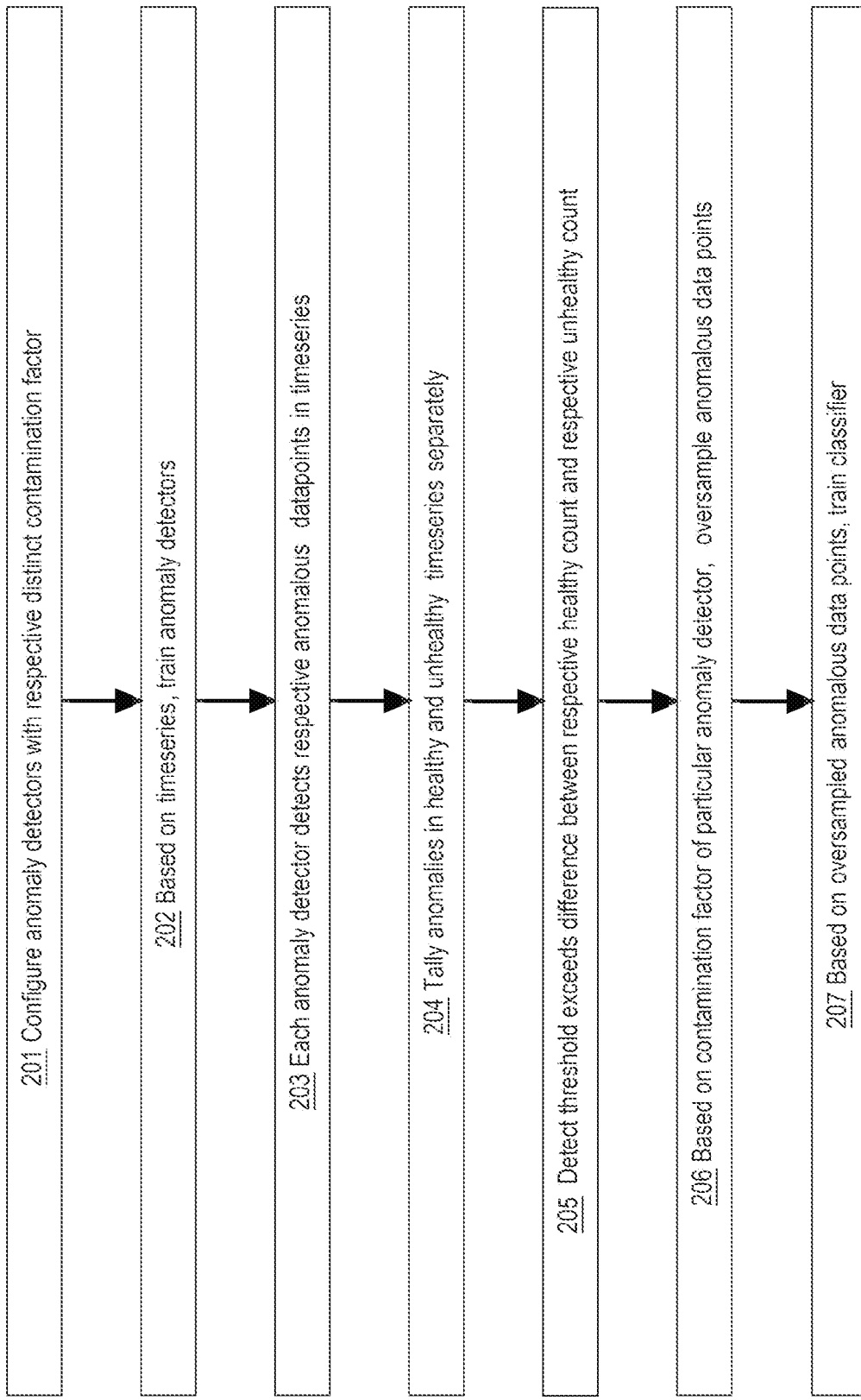
FIG. 2 is a flow diagram that depicts example dataset preprocessing.

FIG. 2 is a flow diagram that depicts an example dataset preprocessing process that computer 100 may perform. FIG. 2 is discussed with reference to FIG. 1.

Step 201 configures each of anomaly detectors 111-112 with a respective distinct contamination factor. In an embodiment, each of anomaly detectors 111-112 is an identically configured (i.e. hyperparameters) instance of sklearn's IsolationForest, LocalOutlierFactor, EllipticEnvelope, or OneClassSVM, all of which have a contamination factor hyperparameter. Each of anomaly detectors 111-112 has a distinct respective value from zero to one as the contamination factor. For example, if the training corpus (including timeseries A-C) contains a hundred timeseries, then a contamination factor of 0.1 for anomaly detector 111 means that anomaly detector 111 should detect that ten of the hundred are anomalous.

In an embodiment, computer 100 instead processes the contamination factor as an integer count of anomalies. For example, ten out of a hundred can be encoded as 0.1, and eleven out of a hundred can be encoded as 0.11. In an embodiment, each anomaly detector has a distinct contamination factor assigned from an integer counter that starts at one and counts upwards by an integer increment such as one or five.

For example, an integer counter for enumerating distinct integer contamination factors may start at five, increment by five, and incidentally stop (per later step 205 discussed below) at a contamination factor of 820, meaning that 820/5=164 anomaly detectors are configured with respective integer contamination factors ranging from 5-820. The training corpus may contain an order of magnitude more datapoints than the contamination factor (e.g. 820 anomalies out of a training corpus of 10,000). As a percentage in this example, the highest contamination factor may be 820/10,000=0.082 eight percent. In other words, there is a sequence of 164 distinct contamination factor percentages ranging from much less than one percent to slightly more than eight percent.

Step 202 uses all timeseries in the training corpus (including timeseries A-C) to (e.g. concurrently) train all (e.g. 164)

anomaly detectors, including anomaly detectors 111-112. Step 202 does not use sampling bias (e.g. oversampling), unlike later steps herein.

Step 203 counts how many anomaly detectors detect each anomalous datapoint in the training corpus. For example, datapoints C0-C1 in unhealthy timeseries C were detected as anomalous by both (i.e. two) anomaly detectors 111-112. Datapoints C2-C3 were detected by only one (i.e. anomaly detector 111).

Step 204 tallies (i.e. subtotals or counts) anomalies in healthy and unhealthy timeseries separately for each of the anomaly detectors as needed for step 205.

Step 205 detects that a predefined threshold exceeds the magnitude (i.e. absolute value) of the difference, for a particular anomaly detector, between the anomaly counts respectively in healthy timeseries and unhealthy timeseries. Step 205 operates as a halting criterion for deciding when incrementing the integer contamination factor should cease, after which no more anomaly detectors are instantiated and configured.

Based on the contamination factor (e.g. 820 out of 10,000) of the particular anomaly detector that satisfied step 205, step 206 oversamples anomalous datapoints. The integer contamination factor of 820 divided by the integer step size of five (820/5=164) may be used as a count of anomaly detectors that are used to weight (i.e. overcount) anomalies. As an example of overcounting, datapoint C1 is counted as anomalous twice because it was detected by both anomaly detectors 111-112. In this example, there are 164 anomaly detectors, and the maximum overcount possible for an anomaly is 164, which occurs if all 164 anomaly detectors agree that a same datapoint is anomalous.

Step 206 oversamples (i.e. with replacement) anomalies (i.e. anomalous datapoints) proportional to their respective overcounts. For example, datapoint C1 with an overcount of two is twice as likely to be sampled as datapoint C2 whose overcount is only one. In other words, step 206 should oversample datapoint C1 twice as many times as datapoint C2.

A state of the art synthetic training corpus may be generated by synthetic minority oversampling technique (SMOTE) that generates synthetic tuples that differ from original tuples. Unlike SMOTE, oversampling herein repeats original datapoints and does not generate distinct (i.e. additional) datapoints. As derived by oversampling anomalies, a synthetic training corpus herein for classifier 120 may contain multiple copies of original datapoints but does not contain synthetic datapoints.

Depending on the embodiment, preparation for sampling may entail using the overcount of an anomaly according to either of the following sampling mechanisms: a) configuring a statistical sampling bias for the anomaly based on the overcount or b) populating a sampling pool with overcount copies of the anomaly. Based on the oversampled anomalous data points from step 206, step 207 trains classifier 120. For example, the biased sampling pool may be used as a synthesized training corpus for classifier 120.

3.0 EXAMPLE SAMPLING ACTIVITIES

Figure 3:
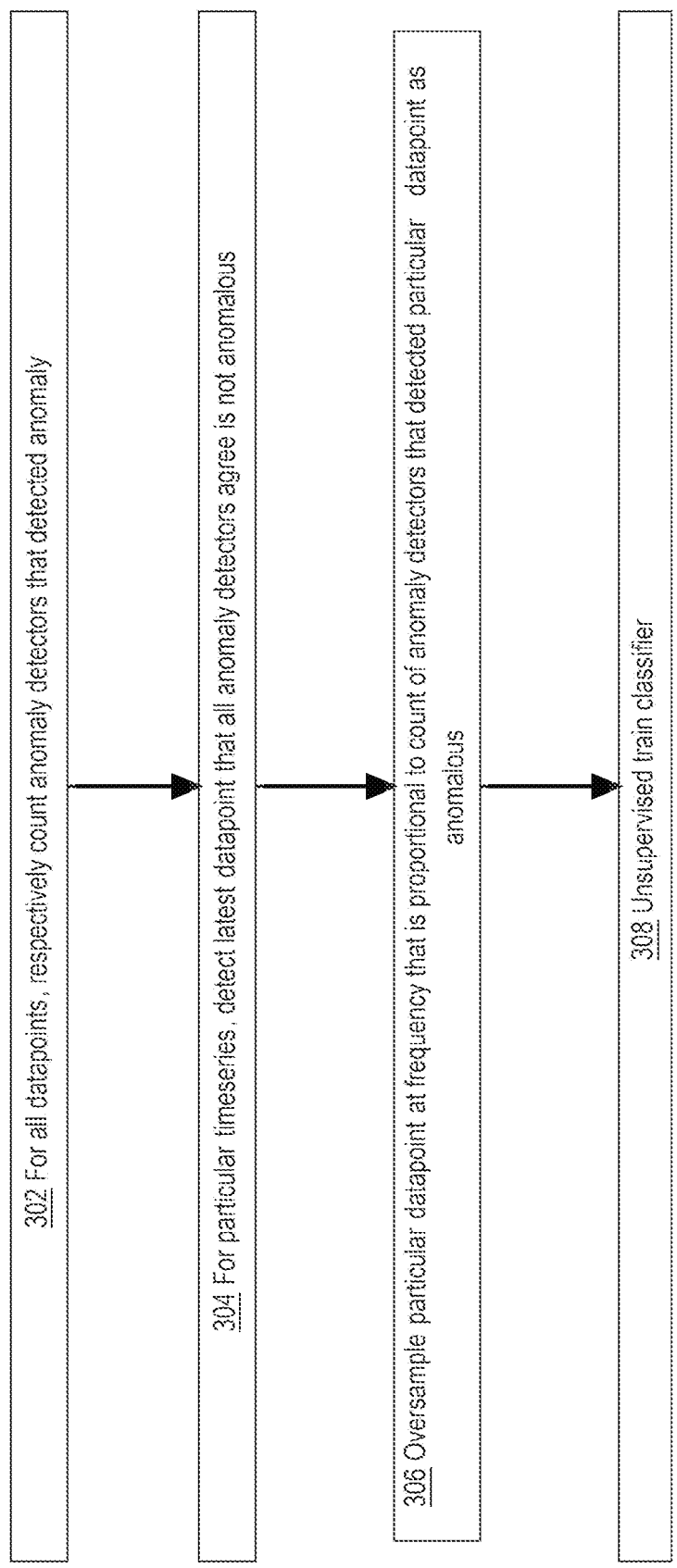
FIG. 3 is a flow diagram that depicts example special activities for sampling by a computer.

FIG. 3 is a flow diagram that depicts example special activities for sampling that an embodiment of computer 100 may perform. FIG. 3 is discussed with reference to FIG. 1. The steps of FIG. 3 may supplement the steps of FIG. 2. The steps of FIGS. 2-3 may be combined or interleaved.

As discussed above, preparation for sampling may entail using the overcount of an anomaly according to either of the following sampling mechanisms: a) configuring a statistical sampling bias for the anomaly based on the overcount or b) populating a sampling pool with overcount copies of the anomaly.

Unbiased sampling occurs when every datapoint is treated as if its overcount were one. For example, an unbiased synthetic training corpus may contain exactly one of each datapoint whether anomalous or not. All datapoints of all devices that have not failed may occur once in a synthetic training corpus.

Herein, undersampling entails excluding some original datapoints from the synthetic training corpus. In an embodiment, any timeseries labeled healthy having a disk that later failed is excluded from the synthetic training corpus.

For all datapoints, step 302 respectively counts anomaly detectors that detected the datapoint as an anomaly. For example, the datapoint at offset 6 in healthy timeseries A has an overcount of zero because all anomaly detectors 111-112 agree that this datapoint is normal (i.e. non-anomalous). The overcount is oversampling metadata for configuring a statistical sampling bias (e.g. relative frequency of sampling that datapoint).

Herein, the last anomaly detector is the anomaly detector that has the highest contamination factor (e.g. 820). In an embodiment, the training duration of an anomaly detector is proportional to the anomaly detector's contamination factor. For example, all 164 anomaly detectors may concurrently start training and then finish training in sequence of increasing contamination factor such that the last anomaly detector to finish training has the highest contamination factor.

In a timeseries labeled unhealthy, step 304 detects the latest datapoint that no anomaly detector detected as anomalous, which is the latest datapoint whose overcount from step 302 is zero. All datapoints in that unhealthy timeseries that occurred at or before that latest datapoint having zero overcount may occur once in the synthetic training corpus. In the dataset for the classifier, the label for these datapoint is healthy.

Step 306 oversamples a particular anomaly (i.e. anomalous datapoint) at a frequency that is proportional to count of anomaly detectors that detected the particular datapoint as anomalous. For example, the overcount of datapoint C1 is two, and the synthetic training corpus may contain two copies of oversampled datapoint C1.

Step 308 unsupervised trains classifier 120 using the synthetic training corpus. In an embodiment, steps 306 and 308 are combined such that sampling occurs during classifier training.

4.0 EXEMPLARY EMBODIMENT

The following is an exemplary embodiment based on embodiments presented earlier herein and based on design choices that do not limit those other embodiments. The computer uses the hard drive dataset for failure prediction to explain how the anomaly detection based preprocessing approach works. That dataset is collected as follows.

In a data center are many healthy drives and some failed drives. A cutoff date is used to sample the trajectories of the drives. To reduce the noise in the samples for healthy drives, the cutoff date is selected so that the drives which are healthy on the cutoff date will stay healthy for the next month. Hence the cutoff date is the same for all the healthy operational drives. For a failed drive, the cutoff date is its last operating date. The computer regularly samples the healthy drives. For a drive failed on day Tf, the computer collects samples every day from day Tf-W to day Tf. Hence, the computer collects W+1 samples for a failed drive. For example, the computer may collect 45 samples (W=44) for a failed drive. All collected samples may occur in original dataset DA for anomaly detection. A sample in DA is either from a trajectory of a healthy or a failed drive.

For demonstration, the following symbols are defined:
j: index for a hard drive
Hj: a unique identifier for healthy drive j
Fj: a unique identifier for failed drive j
H: set of unique identifiers for all healthy drives, {Hj ∀j}
F: set of unique identifiers for all failed drives, {Fj ∀j}
Tj: cutoff date for a healthy drive Hj and the last operation date for a failed drive
Fj Tj−i: ith day before Tj and i is an offset greater than or equal to 0
d(j, Tj−i): a sample for drive j on day Tj−i
Hj,i: a unique identifier for sample d(j, Tj−i) from healthy drive Hj
Fj,i: a unique identifier for sample d(j, Tj−i) from failed drive Fj
Hi: set of unique identifiers for samples for healthy drives at offset i, {Hj,i ∀j}
Fi: set of unique identifiers for samples for failed drives at offset i, {Fj,i ∀j}
HI: set of all unique identifiers for samples for healthy drives, {Hj,i ∀j ∀i}
FI: set of all unique identifiers for samples for failed drives, {Fj,i ∀j ∀i}
NH: total number of healthy drives, |H|
NF total number of failed drives, |F|
DA: training dataset for anomaly detection, DA={d(j, Tj−i) ∀i, j}
DC: training dataset for classification The following steps describe the preprocessing of dataset DA. The computer feeds dataset DA into an anomaly detection model and trains the model. Let k be the contamination number which sets the number of anomalies in the dataset to be found. The computer sweeps k for the anomaly model from 1 to (W+1)*NF with a step size of 5. For each contamination number k, there is an anomaly detection model Mk.

At each sweep with k, the computer uses the trained model, Mk, to find k anomalies in DA. This collection of unique identifiers for the k anomalous samples is denoted as S(k). Depending on whether an anomalous sample originates from a trajectory of a failed or healthy drive, the computer splits S(k) into two sets: S(k, HI), identifiers for samples from healthy drives, and S(k, FI), identifiers for samples from failed drives. By mapping HI to H, from S(k, HI) the computer obtains the set S(k, H) which includes the healthy drive identifiers that are detected as anomalous. By mapping FI to F, the computer obtains set S(k, F) from S(k, FI) which includes the failed drive identifiers that are detected as anomalous. By comparing |S(k, F)|−|S(k, H)|, the computer can automatically estimate the distribution of the samples from failed drives among the samples from healthy drives. When k is small, the model finds more failed drives as anomalies, which means that some samples from these failed drives are very dissimilar from samples from healthy drives and they are very anomalous. As k increases, the model detects more samples from healthy drives as anomalous. Eventually |S(k, H)| increases faster than |S(k, F)| as the new anomalous samples for failed drives are very similar to samples from healthy drives. In other words, the new anomalous samples for failed drives are not that anomalous compared to the samples in S(n, F) where n is less than k.

The computer automatically identifies a contamination number K for which the size difference |S(K, F)|−|S(K, H)| is close to 0 and the difference is not very sensitive to the change of k. For example, the computer may pick K=820 where the size |S(K, F)|−|S(K, H)|=4.

For every identifier in S(K, FI), the computer counts the occurrences of Fj,i in sets from S(1, FI) to S(K, FI) and denotes the occurrences as C(FI) for all anomalous samples from failed drives. The computer applies the same method for S(K, HI) and gets the occurrences for all anomalous samples from healthy drives, C(HI). The higher the occurrence in C(F, I) or C(H, I) is, the more anomalous a sample is. Hence, the computer can use C(F, I) and C(H, I) as anomaly scores (i.e. overcounts) to oversample these samples. The occurrence of the last operating day is the maximum which means that on that day, the sample is very different from the healthy samples. However, when the offset is 6, the sample of the failed drive is close to healthy samples. Labelling this sample as failed and using it to train a model would increase the FPR.

With the anomaly scores, the computer builds synthetic training dataset DC for classification. The computer adds all samples from healthy drives in DA into DC as healthy samples.

For a sample corresponding to S(K, Hj,i), the computer adds α*C(Hj,i) copies into DC as healthy samples where a is a coefficient between 0 and 1. For example, α=0.3.

For a sample corresponding to S(K, Fj,i), the computer adds add C(Fj,i) copies into DC as failed samples. For example, a failed drive may have 6 samples detected as anomalous. In the classification dataset, DC, this failed drive contributes 780 failed samples in total.

For a failed drive Fj in S(K, FI), the computer finds the biggest offset i (i.e. the earliest date) a drive Fj becomes anomalous, which is denoted as ie. If none of the K anomaly detectors detect anomalous data points for failed driver Fj, none of the datapoints in this timeseries will be added into the synthetic training dataset DC. The computer adds the other samples for this drive from day Tf-W to Tf-ie-G to DC as healthy samples where G is the evolving window when a drive evolves from healthy to faulty. For example, G=8. The samples in the last 6 days are added into DC as failed samples and the samples from the last 45 days to last 15 days are added into DC as healthy samples.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
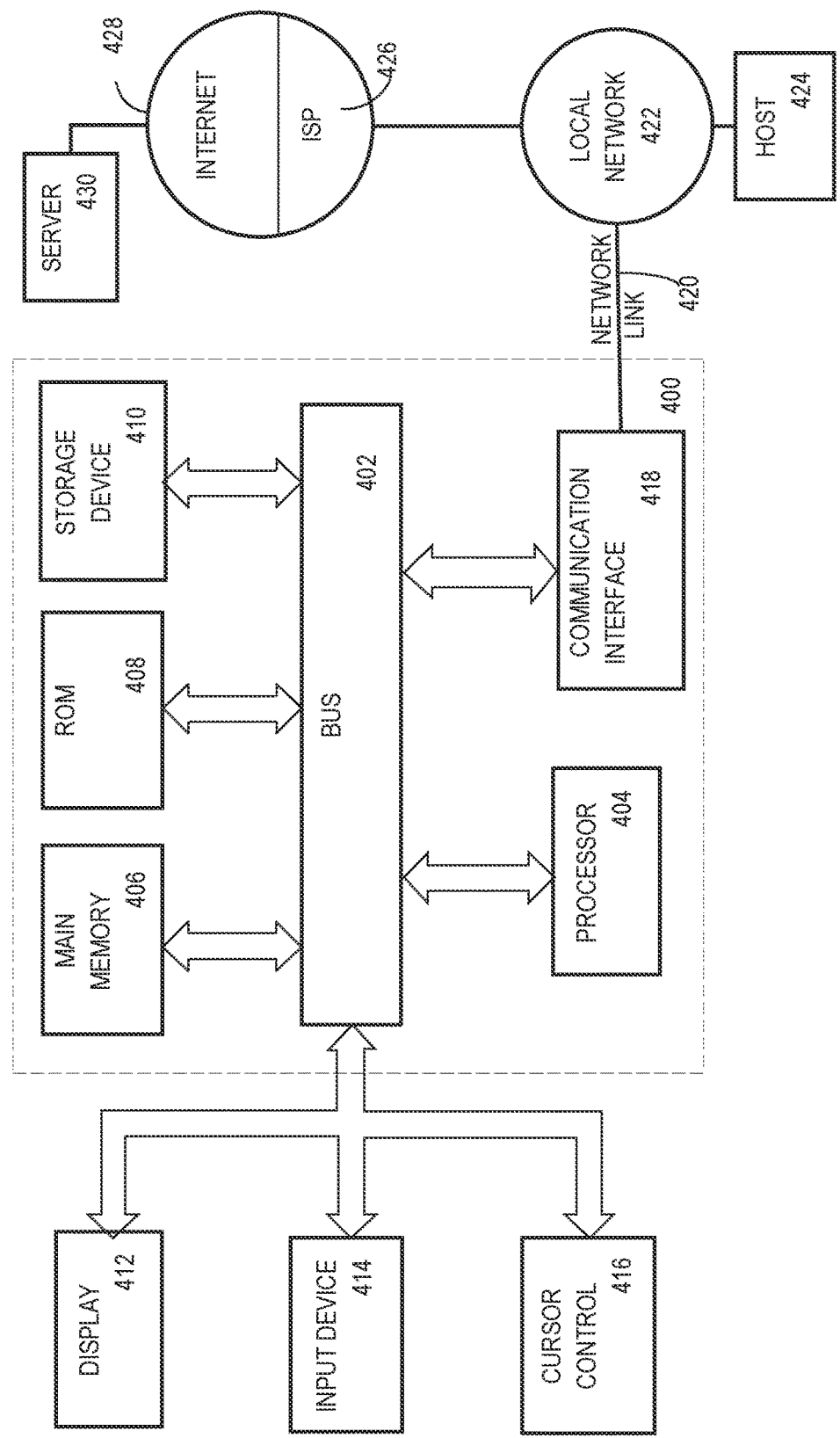
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
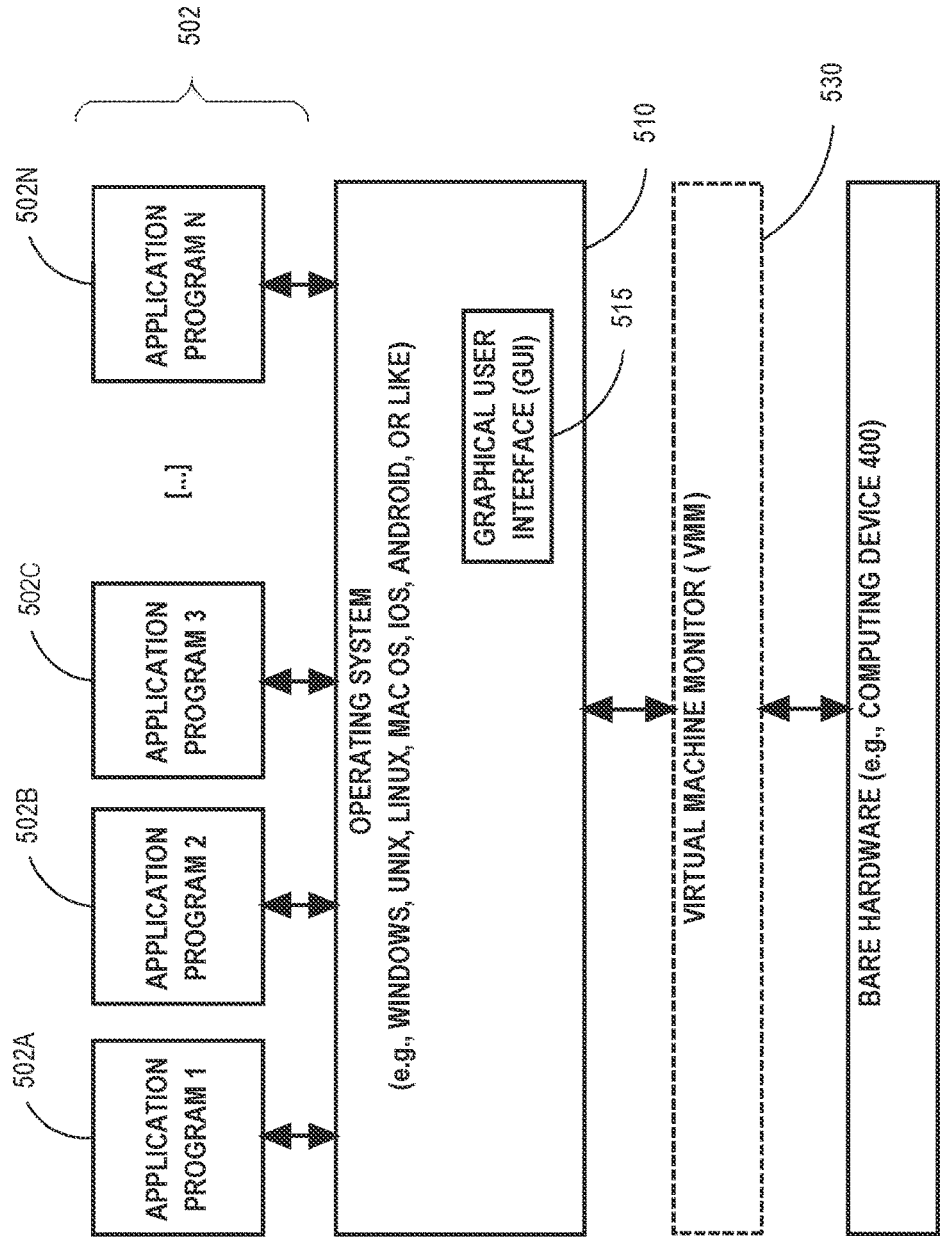
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    training, based on a plurality of timeseries, a plurality of anomaly detectors, wherein:
        each anomaly detector in the plurality of anomaly detectors is configured with a respective distinct contamination factor,
        each timeseries in the plurality of timeseries comprises a temporal sequence of datapoints that characterize a device, and
        each datapoint in the plurality of timeseries comprises a respective label that indicates whether the device failed when the datapoint occurred;
    detecting, by each anomaly detector of the plurality of anomaly detectors after said training:
        a plurality of anomalous datapoints in the plurality of timeseries, wherein a size of the plurality of anomalous datapoints is proportional to said contamination factor of the anomaly detector,
        a respective healthy count of the plurality of anomalous datapoints in timeseries not containing a datapoint whose label indicates the device failed, and
        a respective unhealthy count of the plurality of anomalous datapoints in timeseries containing a datapoint whose label indicates the device failed;
    detecting, for a particular anomaly detector of the plurality of anomaly detectors, that a magnitude of difference between the respective healthy count and the respective unhealthy count is less than a threshold;
    oversampling, based on said contamination factor of the particular anomaly detector, an oversampled plurality of anomalous datapoints from the anomalous datapoints of the plurality of anomaly detectors; and
    training, based on the oversampled plurality of anomalous datapoints, a classifier;
    wherein the method is performed by one or more computers.

2. The method of claim 1 wherein for each anomaly detector of the plurality of anomaly detectors, the size of the plurality of anomalous datapoints is equal to said contamination factor of the anomaly detector.

3. The method of claim 1 wherein said training the classifier is further based on the plurality of timeseries not containing a datapoint whose label indicates the device failed.

4. The method of claim 1 wherein said oversampled plurality of anomalous datapoints contains datapoints from the plurality of timeseries not containing a datapoint whose label indicates the device failed.

5. The method of claim 1 wherein said oversampled plurality of anomalous datapoints contains datapoints from the plurality of timeseries containing a datapoint whose label indicates the device failed.

6. The method of claim 1 wherein said training the classifier is unsupervised.

7. The method of claim 1 further comprising for a particular timeseries in the plurality of timeseries containing a datapoint whose label indicates the device failed, detecting an oldest datapoint that the plurality of anomaly detectors agree is not anomalous.

8. The method of claim 1 wherein the plurality of anomaly detectors are identically configured except for the contamination factor.

9. The method of claim 1 wherein each timeseries in the plurality of timeseries represents a respective distinct disk drive.

10. The method of claim 1 wherein said oversampling said oversampled plurality of anomalous datapoints comprises sampling a particular datapoint at a frequency that is proportional to a count of the plurality of anomaly detectors that detected the particular datapoint as anomalous.

11. One or more computer-readable non-transitory media storing instructions that, when executed by one or more processors, cause:

training, based on a plurality of timeseries, a plurality of anomaly detectors, wherein:
- each anomaly detector in the plurality of anomaly detectors is configured with a respective distinct contamination factor,
- each timeseries in the plurality of timeseries comprises a temporal sequence of datapoints that characterize a device, and
- each datapoint in the plurality of timeseries comprises a respective label that indicates whether the device failed when the datapoint occurred;

detecting, by each anomaly detector of the plurality of anomaly detectors after said training:
- a plurality of anomalous datapoints in the plurality of timeseries, wherein a size of the plurality of anomalous datapoints is proportional to said contamination factor of the anomaly detector,
- a respective healthy count of the plurality of anomalous datapoints in timeseries not containing a datapoint whose label indicates the device failed, and
- a respective unhealthy count of the plurality of anomalous datapoints in timeseries containing a datapoint whose label indicates the device failed;

detecting, for a particular anomaly detector of the plurality of anomaly detectors, that a magnitude of difference between the respective healthy count and the respective unhealthy count is less than a threshold;

oversampling, based on said contamination factor of the particular anomaly detector, an oversampled plurality of anomalous datapoints from the anomalous datapoints of the plurality of anomaly detectors; and training, based on the oversampled plurality of anomalous datapoints, a classifier.

12. The one or more computer-readable non-transitory media of claim 11 wherein for each anomaly detector of the plurality of anomaly detectors, the size of the plurality of anomalous datapoints is equal to said contamination factor of the anomaly detector.

13. The one or more computer-readable non-transitory media of claim 11 wherein said training the classifier is further based on the plurality of timeseries not containing a datapoint whose label indicates the device failed.

14. The one or more computer-readable non-transitory media of claim 11 wherein said oversampled plurality of anomalous datapoints contains datapoints from the plurality of timeseries not containing a datapoint whose label indicates the device failed.

15. The one or more computer-readable non-transitory media of claim 11 wherein said oversampled plurality of anomalous datapoints contains datapoints from the plurality of timeseries containing a datapoint whose label indicates the device failed.

16. The one or more computer-readable non-transitory media of claim 11 wherein said training the classifier is unsupervised.

17. The one or more computer-readable non-transitory media of claim 11 wherein the instructions further cause for a particular timeseries in the plurality of timeseries containing a datapoint whose label indicates the device failed, detecting an oldest datapoint that the plurality of anomaly detectors agree is not anomalous.

18. The one or more computer-readable non-transitory media of claim 11 wherein the plurality of anomaly detectors are identically configured except for the contamination factor.

19. The one or more computer-readable non-transitory media of claim 11 wherein each timeseries in the plurality of timeseries represents a respective distinct disk drive.

20. The one or more computer-readable non-transitory media of claim 11 wherein said oversampling said oversampled plurality of anomalous datapoints comprises sampling a particular datapoint at a frequency that is proportional to a count of the plurality of anomaly detectors that detected the particular datapoint as anomalous.

* * * * *